(12) United States Patent
Shin et al.

(10) Patent No.: US 7,880,828 B2
(45) Date of Patent: Feb. 1, 2011

(54) LIQUID CRYSTAL DISPLAY DEVICE

(75) Inventors: Jae-Won Shin, Busan (KR); Dal-Jae Lee, Seoul (KR)

(73) Assignee: LG Display Co., Ltd., Seoul (KR)

( * ) Notice: Subject to any disclaimer, the term of this patent is extended or adjusted under 35 U.S.C. 154(b) by 131 days.

(21) Appl. No.: 12/314,561

(22) Filed: Dec. 12, 2008

(65) Prior Publication Data

US 2009/0310054 A1 Dec. 17, 2009

(30) Foreign Application Priority Data

Jun. 12, 2008 (KR) .................... 10-2008-0055329

(51) Int. Cl.
*G02F 1/1333* (2006.01)
(52) U.S. Cl. ............................ 349/58; 349/65; 349/116
(58) Field of Classification Search .................. 349/58, 349/116, 149, 150; 361/749; 362/612, 631, 362/632, 633; 345/207
See application file for complete search history.

(56) References Cited

U.S. PATENT DOCUMENTS 6,388,888 B1 * 5/2002 Seko et al. .................. 361/767
2008/0084520 A1 * 4/2008 Nam et al. .................... 349/65

* cited by examiner

*Primary Examiner*—Dung T Nguyen
*Assistant Examiner*—Tai Duong
(74) *Attorney, Agent, or Firm*—Morgan Lewis & Bockius LLP

(57) ABSTRACT

Disclosed is a liquid crystal display (LCD) device provided with a flexible printed circuit (FPC) on a main support, the FPC integrally formed with a color sensor to detect colors of red, green and blue (RGB). The LCD device comprises: a main support having a concaved groove and a through hole partially formed at the concaved groove, the concaved groove formed at a lower surface of a frame with a prescribed width; a light emitting means provided at one side of the main support, and emitting light; a color sensor FPC composed of a flexible printed circuit (FPC) provided at the concaved groove of the main support, and a color sensor fixed to the FPC and inserted into the through hole of the main support, for detecting a color characteristic of light emitted from the light emitting means; and a liquid crystal (LC) panel provided on the main support, and receiving light.

9 Claims, 6 Drawing Sheets

LIQUID CRYSTAL DISPLAY DEVICE

RELATED APPLICATION

The present invention relates to subject matter contained in priority Korean Application 10-2008-0055329, filed Jun. 12, 2008, which is herein expressly incorporated by reference in its entirety.

BACKGROUND OF THE INVENTION

1. Field of the Invention

The present invention relates to a liquid crystal display (LCD) device, and more particularly, to an LCD device provided with a flexible printed circuit (FPC) on a main support, the FPC integrally formed with a color sensor to detect colors of red, green and blue (RGB).

2. Description of the Background Art

Generally, an LCD device comprises an LC panel including a thin film transistor (TFT) array substrate, a color filer substrate facing the TFT array substrate, and an LC layer injected between the two substrates; a driving unit for displaying images on the LC panel; and a backlight unit for supplying light to the LC panel.

On the TFT array substrate, unit pixels are arranged in the form of matrixes. The unit pixels are defined as a plurality of data lines arranged on the TFT array substrate in a vertical direction with a constant gap therebetween are formed to cross a plurality of gate lines arranged in a horizontal direction with a constant gap therebetween.

On the color filter substrate, formed are RGB sub-color filter layers in correspondence to the pixels of the TFT array substrate. On the color filter substrate, further formed is a black matrix for preventing light from leaking between the color filter layers, and for preventing color interference of light passing through the pixels.

Common electrodes and pixel electrodes are respectively formed on each surface of the color filter substrate and the TFT array substrate facing each other, thereby applying an electric field to the LC layer. Here, the pixel electrodes are formed on the TFT array substrate according to each pixel, whereas the common electrodes are integrally formed on an entire surface of the color filter substrate.

A voltage applied to the pixel electrode is controlled under a state that a voltage is applied to the common electrode, thereby changing an oriented status of LC molecules on the LC layer. Accordingly, optical transmittance of the pixels is individually controlled.

The backlight unit serves to supply light to the LC panel that does not spontaneously emit light. An optical transmittance is determined according to an oriented status of LC molecules when light supplied from the backlight unit passes through the LC layer, thereby displaying images.

The backlight unit is largely classified into an edge type and a direct type according to a position of a lamp used as a light source. According to the edge type backlight unit, a lamp is disposed at one side or both sides of an LC panel, and light emitted from the lamp is guided by a light guide plate thus to be displayed on an entire part of a screen of the LC panel.

According to the direct type backlight unit that has developed since the LC panel becomes large with a size more than 20-inch, a plurality of fluorescent lamps are arranged in serial at a lower surface of a diffusion plate, and light is directly irradiated onto an entire surface of the LC panel. The direct type backlight unit implements higher optical efficiency than the edge type backlight unit, thereby being mainly used at an LCD device having a large screen requiring high brightness.

The light source includes a Cold Cathode Fluorescent Lamp (CCFL), a Hot Cathode Fluorescent Lamp (HCFL), an Electro Luminesence (EL), a Light Emitting Diode (LED), etc. Here, the CCFL and the LED are mainly used due to low power consumption.

The fluorescent lamp has advantages that a relatively higher brightness and uniform brightness are implemented. However, the fluorescent lamp has a disadvantage that a color reproduction ratio is low.

The LED or EL has advantages that brightness can be partially controlled, and a color reproduction ratio is high. However, the LED or EL has disadvantages that a relatively lower brightness is implemented, and bright uniformity is lowered.

Figure 1A:
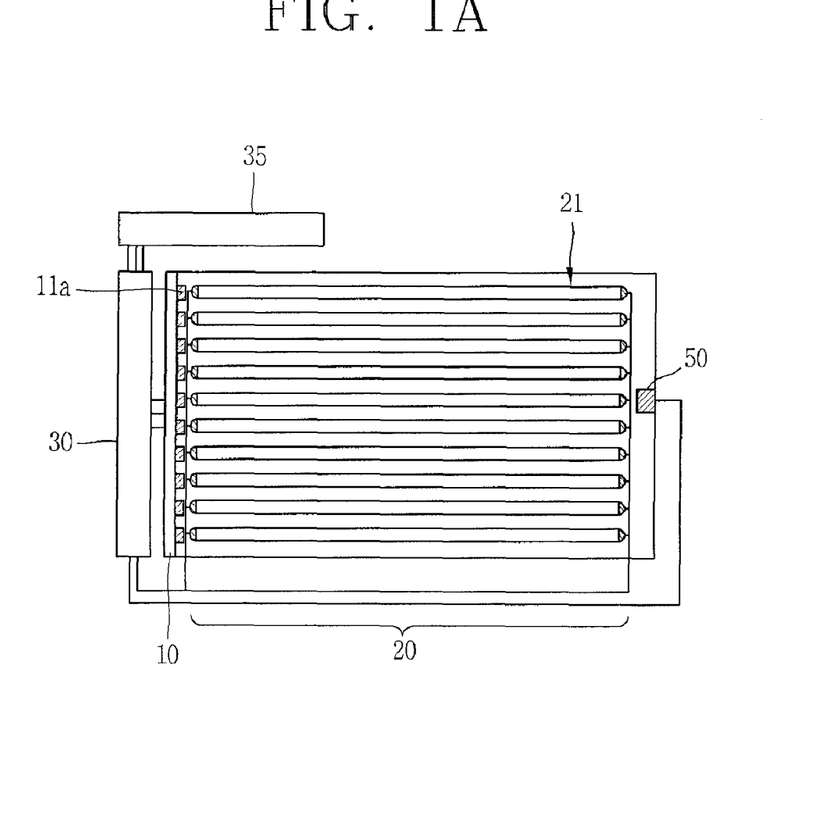
FIG. 1A is a planar view showing a backlight unit in accordance with the conventional art.
Figure 1B:
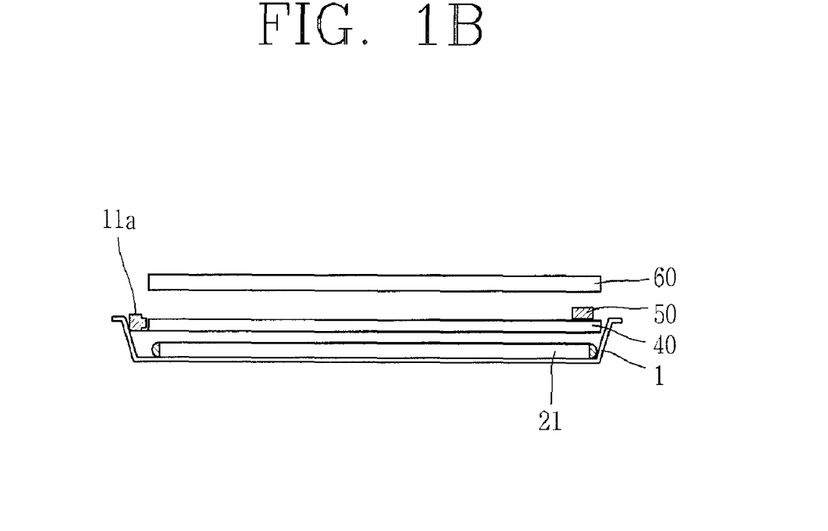
FIG. 1B is a sectional view of a liquid crystal display (LCD) device having the backlight unit of FIG. 1A.

FIG. 1A is a planar view showing a backlight unit in accordance with the conventional art, and FIG. 1B is a sectional view of a liquid crystal display (LCD) device having the backlight unit of FIG. 1A.

Referring to FIGS. 1A and 1B, the conventional LCD device comprises a first light emitting portion 10 having a spontaneous light emitting lamp 11a, and generating light of R, G and B; a second light emitting portion 20 having a bar-shaped plurality of fluorescent lamps 21 arranged in parallel; a color sensor 50 for sensing a wavelength of light emitted from the first light emitting portion 10, and outputting as a voltage value; a driving circuit portion 30 for controlling a color temperature of the spontaneous light emitting portion 11a of the first light emitting portion 10 according to the voltage value output from the color sensor 50; and an interface 35 for transmitting a signal received from outside to the driving circuit portion 30.

The second light emitting portion 20 consists of fluorescent lamps 21 that generate white light. As the fluorescent lamp 21, a Cold Cathode Fluorescent Lamp (CCFL), or a Hot Cathode Fluorescent Lamp (HCFL), etc. may be used.

More specifically, as shown in FIG. 1B, the fluorescent lamps 21 of the second light emitting portion 20 are formed below an LC panel 60, and the first light emitting portion 10 is formed at a side surface of the LC panel 60. A light guide plate 40 for guiding light emitted from the first light emitting portion 10 to the LC panel 60 is further installed below the LC panel 60.

The color sensor 50 for sensing a wavelength of light emitted from the first light emitting portion 10 is installed on an upper end of the light guide plate 40.

A reflection plate (not shown) for guiding light emitted from the second light emitting portion 20 to the LC panel 60 to the maximum may be further installed on an inner surface of a lower cover 1 of the LCD device.

However, when the color sensor is installed on an upper end of the light guide plate, the color sensor may be moved by an external force thus to have a position transition. This may cause a mal-operation of color control and color calibration.

Furthermore, processes to install the color sensor on an upper end of the light guide plate, and processes to electrically connect the color sensor to the circuit driving portion are complicated and difficult, which may require additional costs.

SUMMARY OF THE INVENTION

Therefore, it is an object of the present invention to provide a liquid crystal display (LCD) device capable of providing a flexible printed circuit (FPC) integrally formed with a color sensor, on a main support, for operational facilitation, and capable of enhancing a fixing intensity of the FPC.

To achieve these and other advantages and in accordance with the purpose of the present invention, as embodied and broadly described herein, there is provided an LCD device, comprising: a main support having a concaved groove and a through hole partially formed at the concaved groove, the concaved groove formed at a lower surface of a frame with a prescribed width; a light emitting means provided at one side of the main support, and emitting light; a color sensor FPC composed of a flexible printed circuit (FPC) provided at the concaved groove of the main support, and a color sensor fixed to the FPC and inserted into the through hole of the main support, for detecting a color characteristic of light emitted from the light emitting means; and a liquid crystal (LC) panel provided on the main support, and receiving light.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Hereinafter, a liquid crystal display (LCD) device according to the present invention will be explained in more detail.

Figure 2:
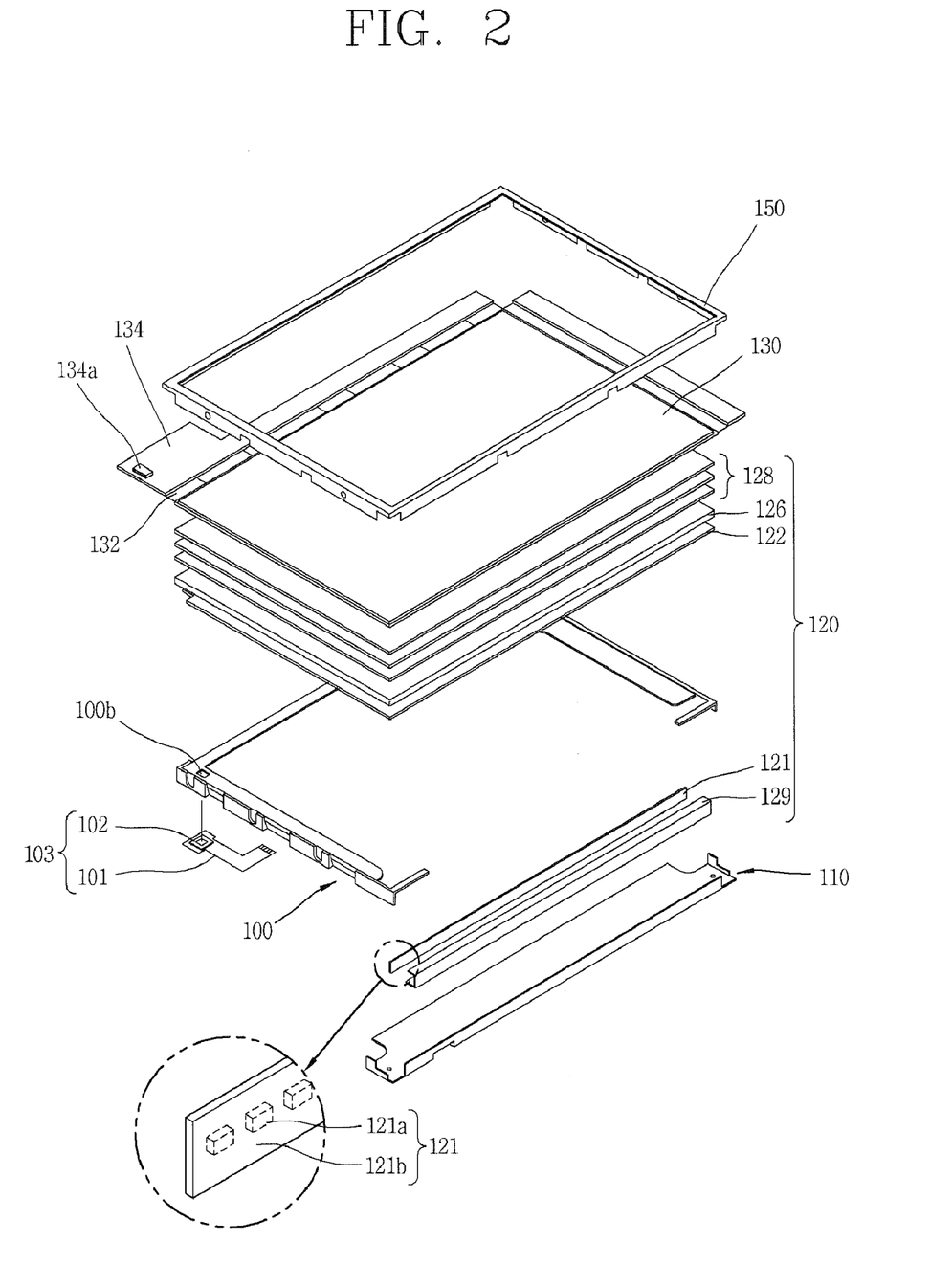
FIG. 2 is an exploded perspective view showing an LCD device according to a first embodiment of the present invention.
Figure 3A:
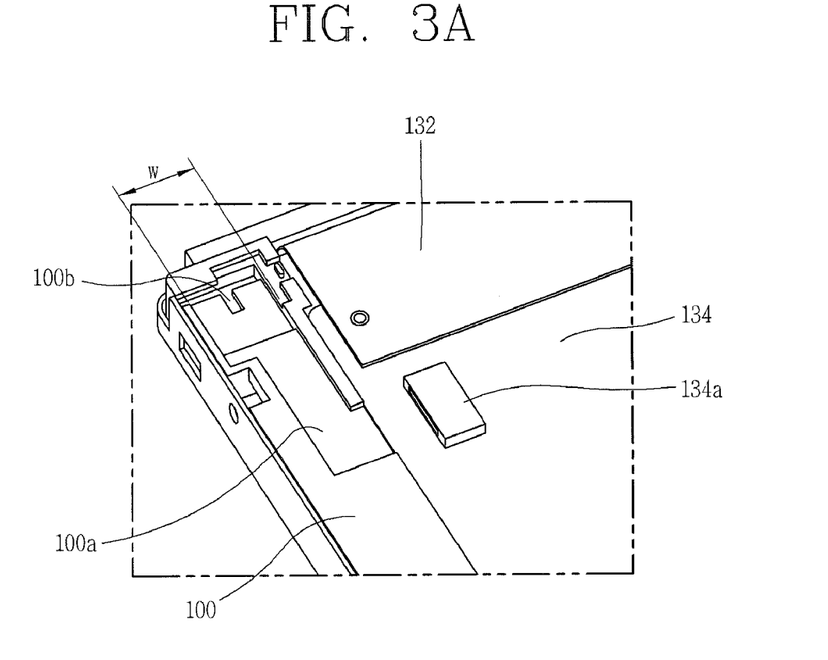
FIG. 3A is a partial rear view of a main support of FIG. 2.
Figure 3B:
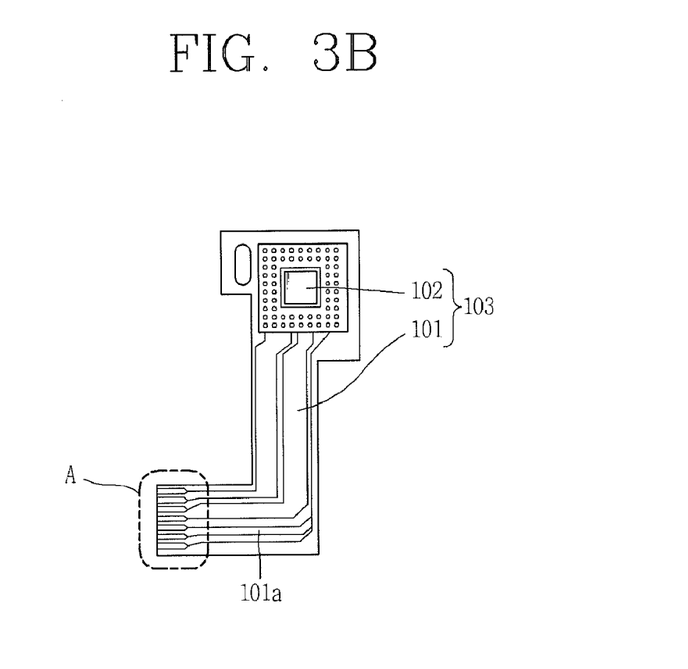
FIG. 3B is a view showing a color sensor FPC (flexible printed circuit) fixed to a concaved groove and a through hole of FIG. 3A.
Figure 4:
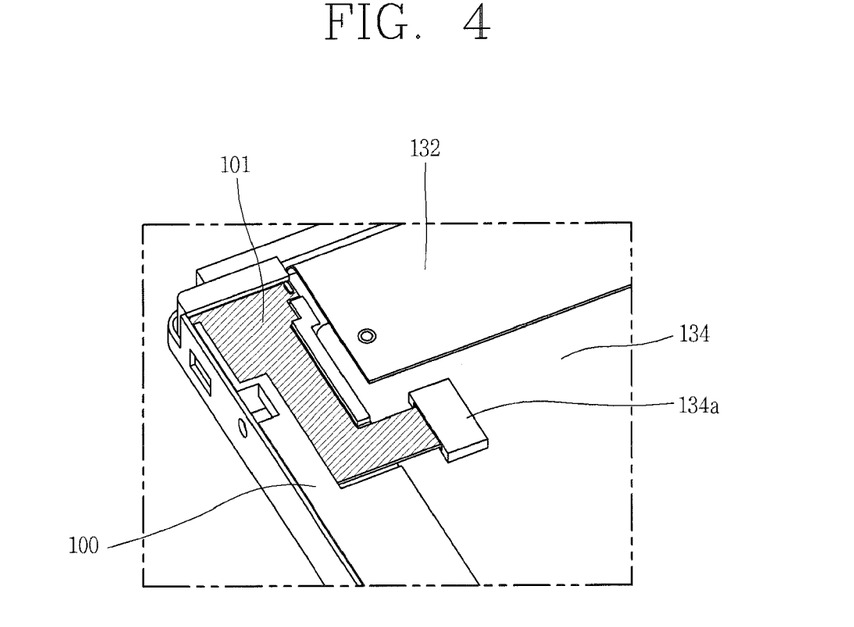
FIG. 4 is a view showing a state that the color sensor FPC of FIG. 3B is coupled onto the main support of FIG. 3A.

FIG. 2 is an exploded perspective view showing an LCD device according to a first embodiment of the present invention, FIG. 3A is a partial rear view of a main support of FIG. 2, FIG. 3B is a view showing a color sensor FPC (flexible printed circuit) fixed to a concaved groove and a through hole of FIG. 3A, and FIG. 4 is a view showing a state that the color sensor FPC of FIG. 3B is coupled onto the main support of FIG. 3A.

Referring to FIGS. 2 to 4, the LCD device of the present invention comprises: a main support 100 of a rectangular frame composed of a horizontal frame disposed to be parallel with a bottom surface, and a vertical frame perpendicular to the horizontal frame, having a concaved groove 100a concavely formed at one corner region of a lower surface of the horizontal frame with a prescribed width (w), and having a through hole 100b partially formed at the concaved groove 100a; a light emitting means 121 provided at one side of the main support 100, and emitting light; a color sensor FPC 103 composed of a flexible printed circuit (FPC) 101 attached to the concaved groove 100a of the main support 100, and a color sensor 102 inserted into the through hole 100b, for detecting a color characteristic of light emitted from the light emitting means 121; and a liquid crystal (LC) panel 130 provided on the main support 100, and receiving light.

In case of a notebook-type LCD device shown in FIG. 2, a backlight unit 120 and the LC panel 130 are sequentially stacked on the main support 100 having an approximate rectangular frame shape and formed of a SUS steel material. A lower cover 100 is coupled to a lower surface of the main support 100. An upper cover 150 that fixes all of the components covers edges of a front surface of the LC panel 130, and is coupled to the main support 100 and the lower cover 110.

The concaved groove 100a disposed at a corner region of the main support 100, and formed on a lower surface of the horizontal frame, is implemented in an 'L'-shape with a small width. The through hole 100b is formed at one end of the 'L'-shaped concaved groove 100a. Preferably, the through hole 100b is formed at a part closer to the corner region of the main support 100. The reasons why the concaved groove 100a and the through hole 100b are formed at the corner regions of the main support 100 are in order to facilitate electrical connection between the color sensor FPC 103 and a connector 134a on the driving circuit portion 134 disposed on a rear surface of the main support 100, with preventing interference with the driving circuit portion 134.

The backlight unit 120 provided on the main support 100 includes a white or silver reflection plate 122; a light emitting means 121 provided along one side of the main support 100; a light guide plate 126 disposed on the reflection plate 122 with maintaining a constant gap from the light emitting means 121; a lamp housing 129 coupled to one side of the light guide plate 126, and protecting the light emitting means 121 from outside; and a plurality of optical sheets 128 disposed on the light guide plate 126. The backlight unit 120 may further include a heat radiating plate (not shown) disposed below the reflection plate 122, and rapidly emitting out heat from the light emitting means 121.

The reflection plate 122 serves to reflect light provided from a lamp disposed at a side surface thereof, i.e., light emitting devices 121a of the light emitting means 121, to the LC panel 130 disposed at an upper side or on a front surface thereof without an optical loss.

The reflection plate 122 is implemented as a film onto which Ag, Al, etc. are coated. Here, the reflection plate 122 has a thickness of about 75~200 μm. The reflection plate 122 has reflectivity of about 90~97% for visible rays. The thicker a coated film is, the higher the reflectivity is.

The light emitting means 121 may consist of a printed circuit board (PCB) 121b having conductive wires and positively(+)/negatively(−) charged electrodes to which a voltage is supplied from outside, and coupled to inside of the lamp housing 129; and a plurality of light emitting devices 121a such as LEDs or OLEDs fixed onto the PCB 121b. Here, the light emitting means 121 of the present invention is not limited to the above components, but may be a metallic PCB that the light emitting devices 121a are integrally formed on a substrate.

The light guide plate 126 is implemented as a transparent plate formed of polymethylmethacrylate, and serves to uniformly distribute light to an entire part of a screen of the LC panel 130 by passing light from the light emitting means 121 disposed at a side surface thereof. Light emitted from the light emitting means 121 is made to be incident onto the light guide plate 126, and is guided into the light guide plate 126. Then, the light is reflected by the reflection plate 122 disposed below the light guide plate 126, thereby being uniformly emitted in a vertical direction.

The optical sheets 128 are provided on the light guide plate 126. The optical sheets 128 may include a diffusion sheet, a prism sheet, a protection sheet, etc. that irradiate light provided from the reflection plate 122 and the light guide plate 126 to the LC panel 130 by enhancing optical efficiency.

The LC panel 130 includes a thin film transistor (TFT) array substrate and a color filter substrate facing each other and maintaining a uniform call gap therebetween, and an LC layer formed between the two substrates. The LC panel 130 includes two polarizers (not shown) attached onto front and rear surfaces thereof one to one.

On the TFT array substrate, formed are a plurality of gate lines and data lines crossing each other and defining a plurality of pixels arranged in the form of matrix. A pixel electrode is formed in each of the pixels. A thin film transistor (TFT) is provided in each of the pixels. The TFT is operated by a gate signal applied to the gate line from outside. And, the TFT applies, to the pixel electrode, a pixel voltage (Vdata) or an image signal input through the data line.

A color filter that reproduces colors of red, green, and blue (RGB) in correspondence to the pixel electrodes of the TFT array substrate is formed at a pixel region of the color filter substrate. Common electrodes are formed on the color filter, thereby facing the pixel electrodes. The color filter substrate includes black matrixes that partition the color filter from each other.

At corner regions of the LC panel 130, more concretely, at a gate pad portion and a data pad portion formed at each end of the gate line and the data line on the TFT array substrate, provided are a Tape Carrier Package (TCP) 132 for applying signals through the pad portions, and a driving circuit portion 134. Here, the TCP 132 and the driving circuit portion 134 attached onto one side of the LC panel 130 are disposed on a rear surface of the main support 100 at the time of an assembly process.

The driving circuit portion 134 receives a voltage value output from the color sensor 102 of the color sensor FPC 103, and compares the voltage value with an initially-set color value of the light emitting devices 121a. Then, the driving circuit portion 134 feeds back the voltage value to the initially-set color value. Here, the color value of the light emitting devices 121 can be controlled by controlling the voltage value through the driving circuit portion 134.

The color sensor FPC 103 disposed at a corner region of a rear surface of the main support 100, with an adjacent state to the driving circuit portion 134, includes an 'L'-shaped FPC 101; a color sensor 102 fixed to one side of the FPC 101, and detecting a color characteristic of light; and a pad portion (A) formed at another side of the FPC 101, and electrically connected to the color sensor 102 through conductive wires 101a.

Here, the FPC 101 is attached to the 'L'-shaped concaved groove 100a having a small width (w) and formed at a corner region of a rear surface of the horizontal frame of the main support 100. The color sensor 102 is inserted into the through hole 100b partially formed at the concaved groove 100b. The pad portion (A) formed at another side of the 'L'-shaped FPC 101 is coupled to the connector 134a of the driving circuit portion 134 provided on a rear surface of the main support 100.

Here, the color sensor 102 serving as an optical sensor for detecting a wavelength of specific light and outputting as a voltage value, is implemented as three or more color sensors 102 for detecting light of R, G and B, respectively. The light emitting means 121 that generates light of R, G and B may be deflected to red or blue according to each strength of the light emitting devices 121a. When the light emitting devices 121 are deflected to red, a color temperature is high. On the contrary, when the light emitting devices 121 are deflected to blue, a color temperature is low.

The color temperature becomes different according to changes of external circumstances such as a usage time and a temperature of the LCD device. After the LCD device is used for a long time, a color temperature different from the original color temperature is displayed. The color sensor 102 detects light provided from the light emitting means 121 without distortion, thereby compensating for changes of a color temperature, and maintaining a constant color temperature. In the present invention, the color sensor 102 fixed onto the FPC 101 is coupled to the concaved groove 100a and the through hole 100b of the main support 100. This prevents motion or separation of the color sensor FPC 103 due to an external force, thereby preventing a mal-operation of color sensing.

The color sensor FPC 103 may be further provided with a double-sided tape so that the FPC 101 can be adhered onto the main frame 100. And, the color sensor FPC 103 may be further provided with a polyimide reinforcing member at another side facing one side of the FPC 101 to which the color sensor 102 is fixed. This allows the FPC 101 to have stiffness, and enhances fixing efficiency of the FPC 101 when the FPC 101 is engaged with the concaved groove 100a of the main support 100.

The color sensor 102 is formed at one corner region of the main support 100 facing the light emitting means 121, thereby more precisely detecting light of RGB provided from the light emitting means 121 disposed far from the color sensor FPC 103 provided at another side of the main support 100, that is, at one corner region of a rear surface of the horizontal frame of the main support 100.

In other words, when the color sensor 102 is positioned too close to the light emitting means 121, color mixture is not smoothly performed. This causes a color temperature not to be precisely detected, even if a color characteristic is detected by the color sensor 102. Accordingly, the color sensor 102 and the light emitting means 121 have to be spaced from each other as far as possible, so as to generate white light without distortion through precise color calibration, and provide the generated white light to the LC panel 130.

However, the notebook-type LCD device according to the first embodiment of the present invention has the following problems.

The FPC 101 having the color sensor 102 fixed thereon and provided at one corner region of a rear surface of the main support 100, and the main support 100 contacting the FPC 101 have very small unitary areas. Also, the color sensor 102 fixed to one side of the 'L'-shaped FPC 101, and the pad portion (A) formed at another side of the FPC 101 and electrically connected to the color sensor 102 have a difficulty in being coupled to the connector 134a of the driving circuit portion 134, due to a small coupling space.

To solve these problems, an LCD device according to a second embodiment has been proposed.

Figure 5A:
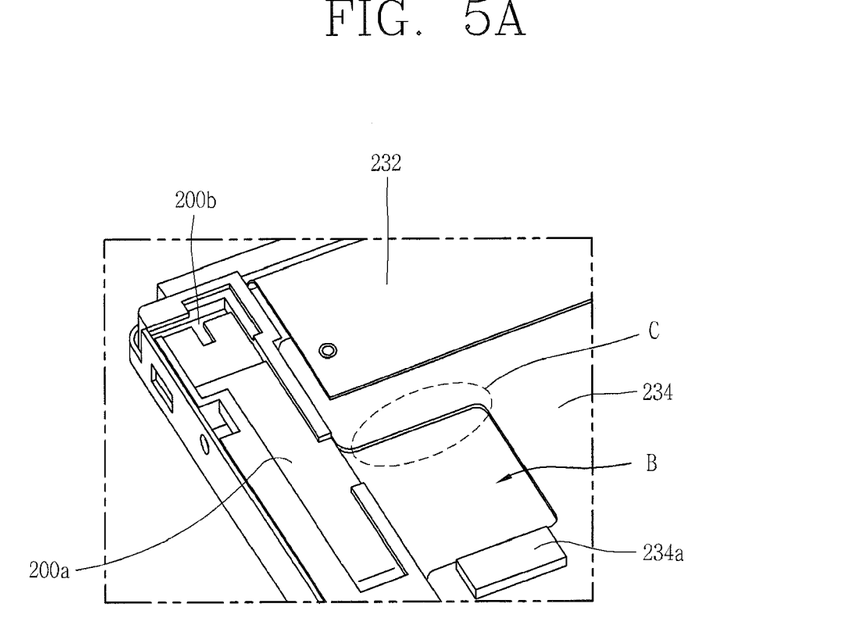
FIG. 5A is a partial rear view showing an LCD device according to a second embodiment of the present invention, which shows a state before the color sensor FPC is coupled onto the main support.
Figure 5B:
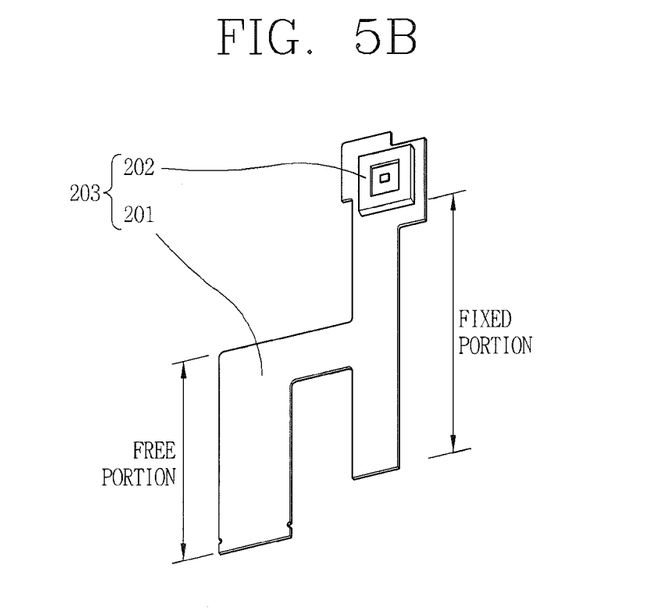
FIG. 5B is a perspective view of the color sensor FPC coupled onto the main support of FIG. 5A.
Figure 6:
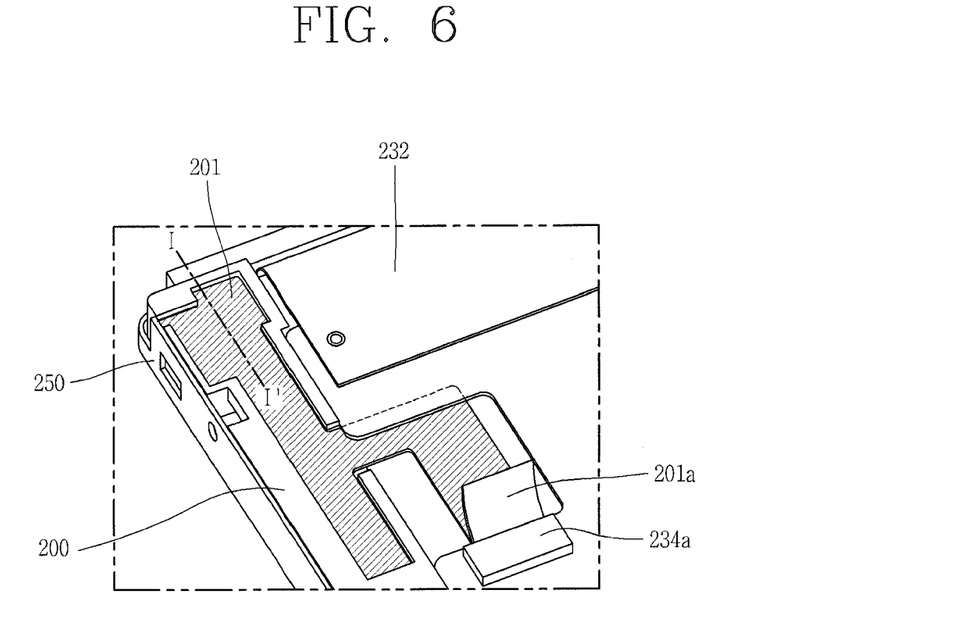
FIG. 6 is a partial rear view of an LCD device having the color sensor FPC coupled onto the main support.

FIG. 5A is a partial rear view showing an LCD device according to a second embodiment of the present invention, which shows a state before the color sensor FPC is coupled onto the main support, FIG. 5B is a perspective view of the color sensor FPC coupled onto the main support of FIG. 5A, and FIG. 6 is a partial rear view of an LCD device having the color sensor FPC coupled onto the main support.

Referring to FIGS. 5A, 5B and 6, the LCD device according to the second embodiment comprises: a main support 200 of a rectangular frame composed of a horizontal frame disposed to be parallel with a bottom surface, and a vertical frame perpendicular to the horizontal frame, having an '⊢'-shaped concaved groove 200a concavely formed at one corner region of a lower surface of the horizontal frame, and having a through hole 200b partially formed at the concaved groove 200a; a light emitting means (not shown) provided at one side of the main support 200, and emitting light; a color sensor FPC 203 composed of an 'h'-shaped flexible printed circuit (FPC) 201 attached to the concaved groove 200a of the main support 200, and a color sensor 202 inserted into the through hole 200b, for detecting a color characteristic of light emitted from the light emitting means; and a liquid crystal (LC) panel provided on the main support 200, and receiving light.

Here, the concaved groove 200a formed on a lower surface of the horizontal frame of the main support 200 has a small width and an '⊢'-shape, and is provided with the through hole 200b at one end thereof. Preferably, the through hole 200b is disposed to be very close to the corner region of the main support 200. The reasons why the concaved groove 200a and the through hole 200b are formed at the corner regions of the main support 200 are in order to facilitate electrical connection between the color sensor FPC 203 and a connector 234a on the driving circuit portion 234 disposed on a rear surface of the main support 200, with preventing interference with the driving circuit portion 234.

The color sensor FPC 203 disposed at a corner region of a rear surface of the main support 200, with an adjacent state to the driving circuit portion 234, includes an 'h'-shaped FPC 201; a color sensor 202 fixed to one side of the FPC 201, and detecting a color characteristic of light; and a pad portion formed at another side of the FPC 201, and electrically connected to the color sensor 202 through conductive wires.

Here, the FPC 201 of the color sensor FPC 203 is divided into an 'l'-shaped fixed portion contacting the main support 200, and a '⊓'-shaped free portion extending from the fixed portion and having a pad portion at the end thereof.

Here, the substrate having the driving circuit portion 234 does not have a part (B) corresponding to a length or a width of the free portion of the FPC 201. Also, the connector 234a for connecting the pad portion formed at one end of the free portion to the driving circuit portion 234 has position change when compared to that of the first embodiment. The connector 234a is fixed to a lower end of the substrate having one part opened or removed, and terminals of the connector 234a to which the pad portion of the color sensor FPC 203 is coupled are configured to be toward an upper side.

The fixed portion of the FPC 201 is attached to the '⊢'-shaped concaved groove 200a having a small width and formed at a corner region of a rear surface of the horizontal frame of the main support 200. And, the color sensor 202 is inserted into the through hole 200b partially formed at the concaved groove 200b. The pad portion formed at another side of the '⊓'-shaped portion extending from the fixed portion and included in the 'h'-shaped FPC 201, is electrically connected to the connector 234a of the driving circuit portion 234 provided on a rear surface of the main support 200.

A connection supplementary means 201a may be additionally formed at the pad portion of the FPC 201 for facilitation of detachable coupling between the pad portion and the connector 234a of the driving circuit portion 234. Any film having stiffness may be used as the connection supplementary means 201a. The connection supplementary means 201a may be formed of a poly-based film. Owing to the connection supplementary means 201a, the pad portion of the color sensor FPC 203 can be easily detachably coupled to the connector 234a of the driving circuit portion 234.

One upper part (C) of the driving circuit portion 234 covers a part of the free portion of the FPC 201 at the '⊏'-shaped part (B). Accordingly, even if the driving circuit portion 234 is moved due to an external impact, etc., the FPC 201 is prevented from being detached from the concaved groove 200a of the main support 200.

In the LCD device according to the second embodiment, a contact area of the FPC 201 to the concaved groove 200a of the main support 200 is larger than that in the LCD device according to the first embodiment, and operational efficiency is increased due to the '⊓'-shaped free portion of the FPC 201. Furthermore, since the substrate of the driving circuit portion 234 adjacent to the free portion of the FPC 201 covers some parts of the free portion of the FPC 201, even if the driving circuit portion 234 is moved due to an external force, the FPC 201 is prevented from being detached from the concaved groove 200a of the main support 200.

The color sensor FPC 203 may be further provided with a double-sided tape so that the FPC 201 can be adhered onto the concaved groove 200a of the main frame 200. And, the color sensor FPC 203 may be further provided with a polyimide reinforcing member at another side facing one side of the FPC 201 to which the color sensor 202 is fixed. This allows the FPC 201 to have stiffness, and enhances fixing efficiency of the FPC 201 when the FPC 201 is engaged with the concaved groove 200a.

The color sensor 202 is formed at one corner region of the main support 200 facing the light emitting means (not shown), thereby more precisely detecting light of RGB provided from the light emitting means disposed far from the color sensor FPC 203 provided at another side of the main support 200, that is, at one corner region of a rear surface of the horizontal frame of the main support 200.

In other words, when the color sensor 202 is positioned too close to the light emitting means, color mixture is not smoothly performed. This causes a color temperature not to be precisely detected, even if a color characteristic is detected by the color sensor 202. Accordingly, the color sensor 202 and the light emitting means have to be spaced from each other as far as possible, so as to implement more precise color calibration, and to provide white light without distortion to the LC panel (not shown).

Figure 7:
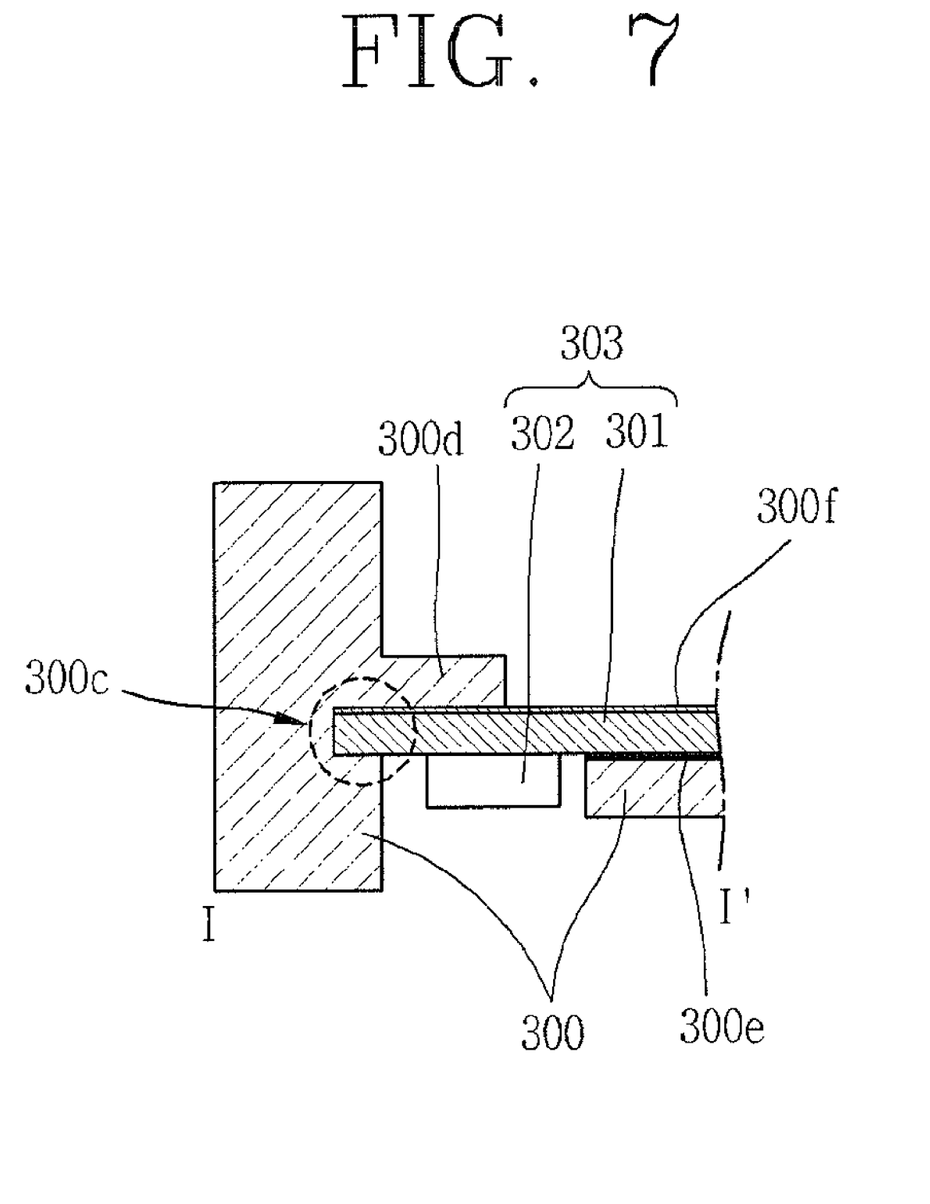
FIG. 7 is a sectional view taken along line 'I-I' of FIG. 6, which shows an LCD device according to a third embodiment of the present invention.

FIG. 7 is a sectional view taken along line 'I-I' of FIG. 6, which shows an LCD device according to a third embodiment of the present invention. FIG. 7 shows a structure of a concaved groove more enhanced than the concaved grooves 100a and 200a of the main supports according to the first and second embodiments.

As shown in FIG. 7, a main support 300 according to the third embodiment of the present invention further includes an FPC insertion portion 300c concavely formed along one or more side walls of the main support 300 having a concaved groove (not shown), and for inserting an FPC 301 of a color sensor FPC 303; and a protrusion 300d disposed at an upper side of the FPC insertion portion 300c, for guiding the FPC 301.

Preferably, the FPC insertion portion 300c and the protrusion 300d formed at a side wall of the concaved groove formed at a corner region of a rear surface of the main support 300, is disposed at a part where the color sensor 302 of the color sensor FPC 303 is positioned. The reasons are in order to prevent the color sensor FPC 303 from moving even when an external force is applied to the LCD device, and in order to easily support a load of the color sensor 302 attached to the FPC 301.

The color sensor FPC 303 may be further provided with a double-sided tape 300e so that the FPC 301 can be adhered onto the concaved groove of the main frame 300. And, the color sensor FPC 303 may be further provided with a polyimide reinforcing member 300f at another side facing one side of the FPC 301 to which the color sensor 302 is fixed. This allows the FPC 301 to have stiffness, and enhances fixing efficiency of the FPC 301 when the FPC 301 is engaged with the concaved groove of the main support 300.

A light emitting means, a light guide plate, an LC panel, etc. of the LCD device according to the third embodiment will be substituted by those of the aforementioned embodiments.

In the first to third embodiments of the present invention, when the color sensor FPCs 103, 203 and 303 are attached onto the main supports 100, 200 and 300, and coupled to the connectors of the driving circuit portion, fixing efficiency is enhanced. Accordingly, a mal-operation of color sensing due to position change of the sensors is prevented.

The first to third embodiments of the present invention may be modified in various manners. Modifying the 'L'-shaped FPC into an 'h'-shaped FPC indicates that an FPC having another shape can be implemented.

Furthermore, enhancing a fixing intensity of the FPC on the main support by controlling an adhesion degree therebetween, and enhancing operational efficiency by setting a ratio of the free portion of the FPC, may be modified according to the initial design.

The present invention is not limited to the above configuration, but to disclose the most preferable case of the main support and the color sensor FPC coupled to the main support.

In the present invention, the color sensor FPC is provided on the main support, thereby maximizing operational facilitation.

Furthermore, a contact area between the color sensor FPC and the main support is increased so as to prevent the color sensor FPC from being detached from the main support.

Furthermore, operational efficiency is increased by modifying a structure of the color sensor FPC.

The foregoing embodiments and advantages are merely exemplary and are not to be construed as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
   a main support having a concaved groove and a through hole partially formed at the concaved groove, the concaved groove formed at a lower surface of a frame with a prescribed width;
   a light emitting means provided at one side of the main support, and emitting light;
   a color sensor FPC composed of a flexible printed circuit (FPC) provided at the concaved groove of the main support, and a color sensor fixed to the FPC and inserted into the through hole of the main support, for detecting a color characteristic of light emitted from the light emitting means; and
   a liquid crystal (LC) panel provided on the main support, and receiving light,
   wherein the concaved groove having the through hole is disposed at a corner region of the main support.

2. The LCD device of claim 1, wherein the main support further comprises:
   a protrusion protruding from a side wall of the concaved groove; and
   an FPC insertion portion having side walls partially concaved below the protrusion, for inserting the FPC.

3. The LCD device of claim 1, wherein the FPC having the color sensor fixed thereto has an 'L' shape.

4. The LCD device of claim 3, wherein the main support has an 'L'-shaped concaved groove in correspondence to the 'L'-shaped FPC.

5. The LCD device of claim 1, wherein the FPC having the color sensor fixed thereto has an 'h'-shape.

6. The LCD device of claim 5, wherein the main support has an '⊢'-shaped concaved groove in correspondence to the 'h'-shaped FPC.

7. The LCD device of claim 1, wherein the light emitting means is either a light emitting diode (LED), or an organic light emitting diode (OLED).

8. The LCD device of claim 1, wherein the FPC is further provided with a polyimide reinforcing member that causes stiffness of the FPC, at a side opposing to a side where the color sensor is fixed.

9. The LCD device of claim 1, wherein the FPC is further provided with a double-sided tape at a region except for the color sensor, so as to be adhered to the concaved groove of the main support.

* * * * *